US010893526B1

(12) United States Patent
Saha et al.

(10) Patent No.: US 10,893,526 B1
(45) Date of Patent: Jan. 12, 2021

(54) DYNAMICALLY MODIFYING RADIO STATES OF A USER DEVICE

(71) Applicant: Sprint Communications Company L.P., Overland Park, KS (US)

(72) Inventors: Sougata Saha, Olathe, KS (US); Nick J. Baustert, Overland Park, KS (US); Andrew Lawrence Liszewski, Kansas City, MO (US); Rajveen Narendran, Olathe, KS (US); Sreekar Marupaduga, Overland Park, KS (US); Saravana Kumar Velusamy, Olathe, KS (US); Ryan Christopher Lindstrom, Olathe, KS (US); Chris David Hiesberger, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/398,777

(22) Filed: Apr. 30, 2019

(51) Int. Cl.
*H04W 72/04* (2009.01)
*H04W 52/02* (2009.01)
(52) U.S. Cl.
CPC ..... *H04W 72/048* (2013.01); *H04W 52/0209* (2013.01)

(58) Field of Classification Search
CPC ............. H04W 72/042; H04W 72/048; H04W 52/0209; H04W 76/27; H04W 8/22
See application file for complete search history.

(56) References Cited

U.S. PATENT DOCUMENTS

| | | | |
|---|---|---|---|
| 2015/0181640 A1* | 6/2015 | Kwong | H04W 72/042 370/329 |
| 2019/0141742 A1* | 5/2019 | Zhou | H04B 7/02 |
| 2020/0045767 A1* | 2/2020 | Velev | H04W 76/27 |

* cited by examiner

*Primary Examiner* — Wei Zhao

(57) ABSTRACT

Systems and methods are provided for dynamically modifying the radio state of a user device based on monitored properties of the user device. One or more device properties associated with the power of the user device are monitored to determine a radio state change for the user device based on a triggering event. The triggering event corresponds to the one or more monitored device properties, and based on the determined radio state change for the user device, the radio state of the user device is automatically modified. Based on the modified radio state, information is transmitted to a cell site, the information including modified user device capability information. Based on the modified user device capability information, the user device receives communications from the cell site.

18 Claims, 4 Drawing Sheets

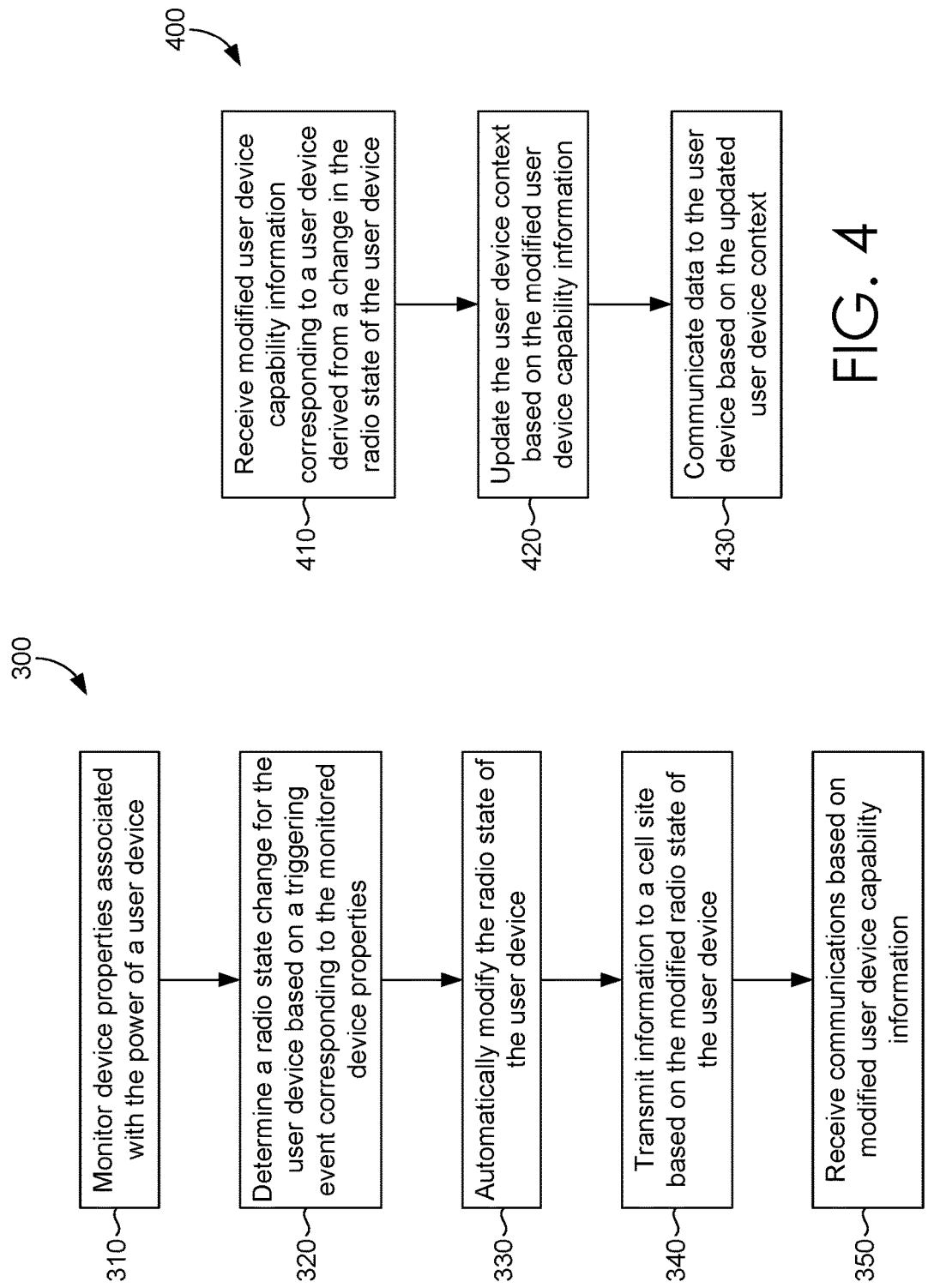

DYNAMICALLY MODIFYING RADIO STATES OF A USER DEVICE

SUMMARY

Embodiments of the technology described herein are directed to, among other things, systems and methods for dynamically modifying radio states of a user device. For example, user device properties associated with the power of a user device can be monitored for a triggering event to automatically modify the radio state of the user device. Based on a determined triggering event associated with a user device property, a radio state change can be determined to then automatically modify the radio state of the user device. Based on the modified radio state of the user device, updated user device capability information can be sent to a cell site in communication with a network such that the cell site can transmit communications to the user device based on the updated user device capability information.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein:

FIG. 3 is a flow diagram showing an example method of dynamically modifying a radio state of a user device, in accordance with some aspects of the technology described herein;

FIG. 4 is a flow diagram of an example method for providing data to a user device based on dynamically changing radio states, in accordance with some aspects of the technology described herein.

DETAILED DESCRIPTION

Figure 1:
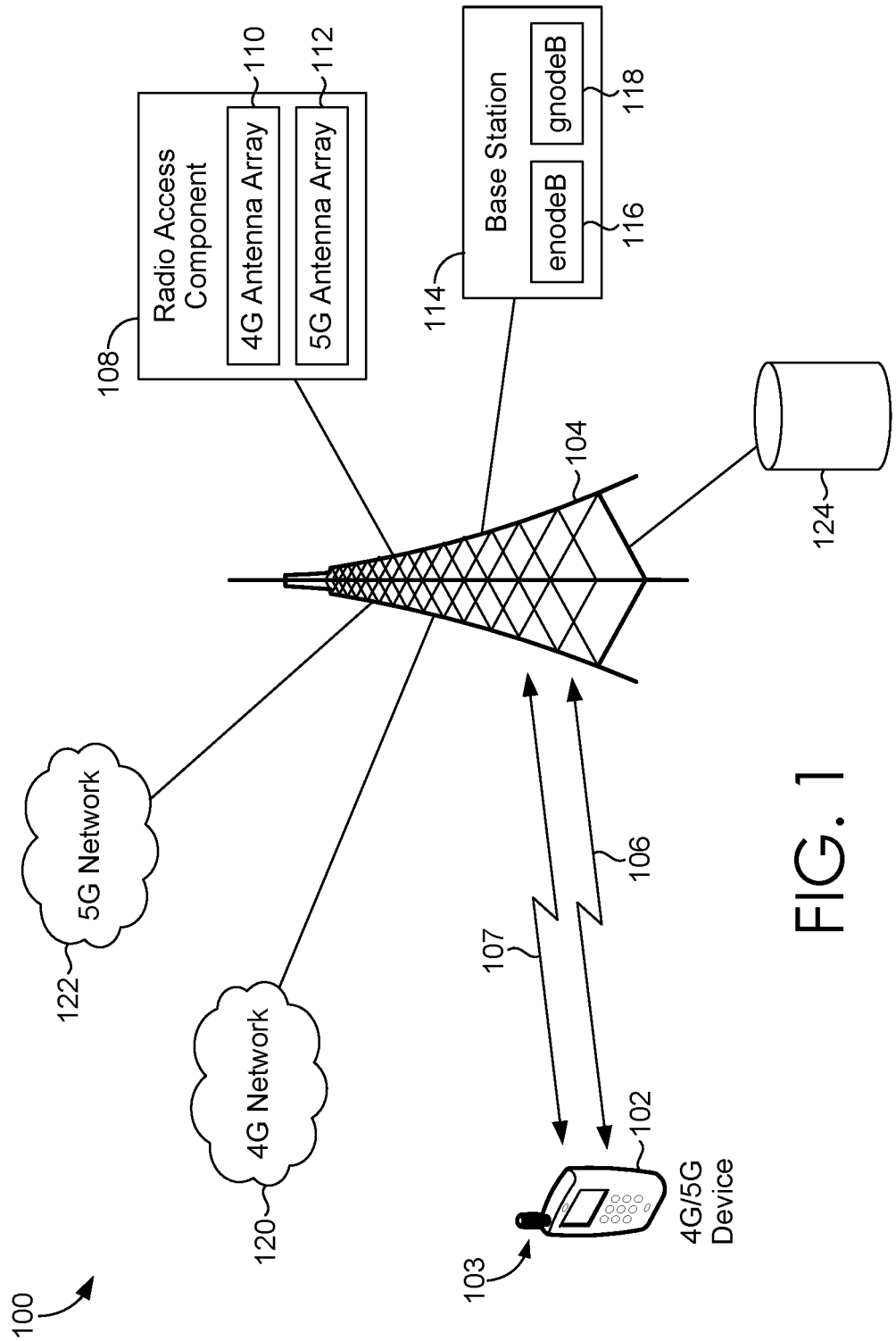
FIG. 1 is a diagram of an example network environment, in accordance with some aspects of the technology described herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As new radio access technologies are being deployed, more advanced user device technology is also being developed, such that user devices are capable of utilizing both new and legacy radio access technologies. Accordingly, some user devices can have multiple transmitters for connecting to different radio access technologies. For instance, some user devices can have one transmitter dedicated to connecting a user device to a 5G network and another transmitter dedicated to connecting a user device to a 4G network. However, when utilizing multiple radio access technologies, the power draw, or power consumption, of user devices is increased, thereby decreasing the power reserves of a user device more rapidly. As such, there is a need for a way to effectively and efficiently conserve or utilize the power reserves (e.g. battery life) of a user device as it communicates with, or otherwise exchanges information with, one or more wireless networks.

There are several advantages to dynamically modifying the radio state of a user device. For instance, it allows for the optimization of transmitting and/or receiving information between a user device and one or more networks. Further, by modifying the radio state of a user device, the user device can more efficiently and effectively utilize its power supply as the user device transmits and receives data or other information with a network.

According to aspects of the technology described herein, a method is provided for dynamically modifying the radio state of a user device based on monitored properties of the user device. The method comprises monitoring one or more device properties associated with the power of the user device to determine a radio state change for the user device based on a triggering event. The triggering event can correspond to the one or more monitored device properties, and based on the determined radio state change for the user device, automatically modifying the radio state of the user device. The method further comprises transmitting information to a cell site in communication with a network based on the radio state, or modified radio state, of the user device. In some instances, a portion of the information transmitted to the cell site includes modified user device capability information. Based on the user device capability information, or modified user device capability information, the user device can receive communications from the cell site.

According to further aspects of the technology described herein, one or more computer-readable media is provided having computer-executable instructions embodied thereon that, when executed, perform a method for dynamically changing a radio state of a user device based on a device property associated with the power of the user device. The method comprises determining a radio state change for the user device having an initial radio state based on a triggering event corresponding to one or more monitored user device properties, the user device properties being associated with the power of the user device. Further, the method comprises automatically modifying the radio state of the user device and transmitting user device capability information to a cell site, where the user device capability information is derived from the radio state, or modified radio state, of the user device. Based on the user device capability information the user device can receive appropriate communications from the cell site.

According to even further aspects of the technology described herein, a method is provided for providing data to a user device based on dynamically changing, or otherwise modifying, radio states of the user device. The method comprises receiving by a cell site modified user device capability information of a user device, where the modified user device capability information is derived from a change in the radio state of the user device. Based on the modified user device capability information, a user device context can be updated at the cell site, and subsequently data can be communicated to the user device by the cell site based on the updated user device context.

Throughout this disclosure, several acronyms and shorthand notations may be used to aid the understanding of certain concepts pertaining to associated networks and systems, services, and devices. The acronyms and shorthand notations are intended to help provide an easy methodology of communicating the idea expressed herein and are not meant to be limiting in scope. Further various technical terms are used throughout this description. An illustrative resource that provides various aspects of these terms can be found in Newton's Telecom Dictionary, 31st Edition (2018).

The term "transmitting/receiving component" as used herein may include any antenna, antenna system, antenna configuration or other component configured to broadcast and/or receive a wireless communications signals, for example to enable communications between a network and a mobile communication device via a cell site. A "transmitting/receiving component" or "communication component" may refer to an element associated with a cell site or user equipment (UE) that transmits and receives signals. The terms "user device," "user equipment," "high performance/power user equipment," "mobile device," "mobile handset," and "mobile transmitting element" may be used interchangeably in this description. The term "high power/performance user equipment" (HPUE) as used herein refer to a class of user equipment enabled to transmit a higher maximum power output than other UE or user devices. It is to be understood that a user device so enabled can transmit a power output in congruence with standard UE or HPUE and can operate at one or both capabilities.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring now to the drawings in more detail, and initially to FIG. 1, a network environment 100 is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

FIG. 1 illustrates a user device 102 (e.g. a 4G/5G user device) that can be implemented in network environment 100, in accordance with various aspects of the present technology. While the terms 4G and 5G are used herein, these refer to any one of the many radio access technologies currently available or that may be deployed and available in the future. 4G and 5G are used simply as examples, and are not intended to limit aspects described herein. Additionally, while FIG. 1 only depicts a single device, any number of devices may be deployed in a given network environment. 4G/5G device 102 includes one or more communication links 106 and 107 to the cell site 104. More specifically, communication links 106 and 107 connect to radio access component 108. Multiple communication links are illustrated for 4G/5G device 102 as it is capable of communicating with multiple radio access technologies (e.g. 4G and 5G). As mentioned previously, a 4G/5G device can have multiple transmission/receiving components 103 for this purpose.

In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices. In some aspects, user device 102 can correspond to computing device 500 in FIG. 5. Thus, a user device can include, for example, a display(s), a power source(s) (e.g., a battery), a data store(s), a speaker(s), memory, a buffer(s), a radio(s), and the like. In some implementations, user device 102 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

The radio of a cell site may include multiple antennas, and in some instances, may include a first set of antennas for a first radio access technology and a second set of antennas for a second radio access technology. As such, as illustrated, antenna array (4G) 110 includes the antennas for transmitting/receiving data or information using 4G technology, and antenna array (5G) 112 includes the antennas for transmitting/receiving data or information using 5G technology. Typically, when a cell site 104 (which typically includes a radio access component and a base station) is deployed, a portion of channel bandwidth is allocated to one radio access technology, and the other portion of channel bandwidth is allocated to the other radio access technology. Radio access component 108 is communicatively coupled to base station 114, which includes an eNodeB 116 for 4G communications via 4G network 120 and a gNodeB 118 for 5G communications via 5G network 122. Additionally, cell site 104 can include a data store 124 for storing network information or device information (for example, information about 4G/5G device 102). Data store 124 can be local to cell site 104, or remote, for example in communication with cell site 104 via one or more servers.

Communications links, such as the wireless telecommunication links shown in FIG. 1 (e.g. communications links 106 and 107) between the user device 102 and the cell site 104, or more particularly radio access component 108, may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, 802.16, and the like.

Figure 2:
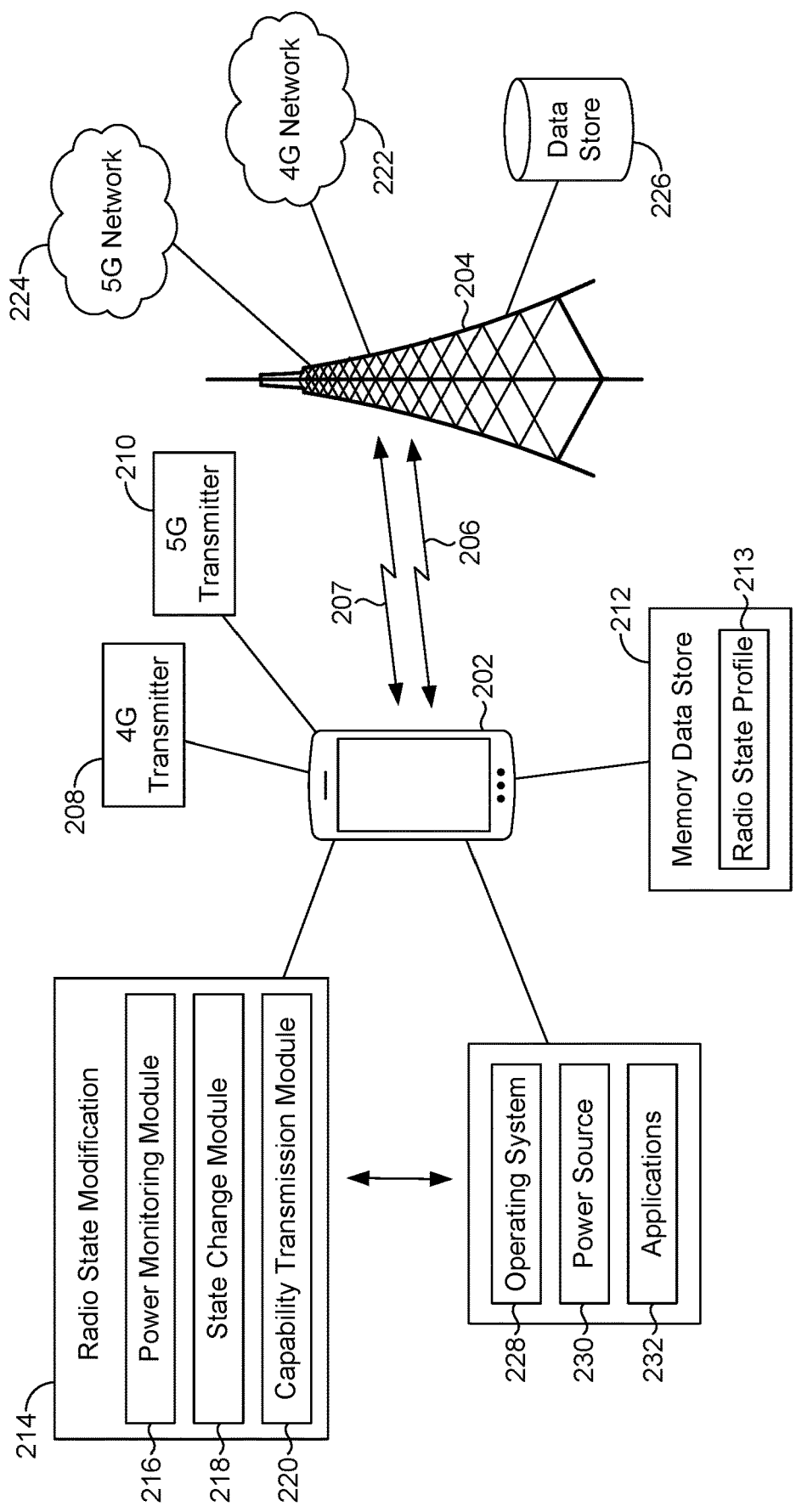
FIG. 2 is a diagram of an example operating environment, in accordance with some aspects of the technology described herein.

Referring now to FIG. 2, an example operating environment 200 is depicted in accordance with embodiments of the technology described herein. Operating environment 200 includes 4G/5G device 202 and cell site 204. Cell site 204 can include a radio access component (e.g., 108 of FIG. 1) and a base station (e.g., 114 of FIG. 1) to enable connectivity between 4G/5G device 202 and one or more networks (e.g., 4G network 222 and 5G network 224). Cell site 204 (and any of its components) can additionally be in communication with data store 226. In some embodiments, data store 226 can store information about user device 202, for example the radio state of user device 202, or a context of user device 202. To enable connectivity between 4G/5G device 202 and cell site 204 (more specifically networks 222 and 224), user device 202 may be equipped with multiple transmission/receiving components, such as 4G transmitter 208 and 5G transmitter 210. The transmission/receiving components enable user device 202 to communicate with, or otherwise exchange information with, networks 222 (4G network) and 224 (5G network) via communications links 206 and 207.

User device 202 includes, among other things, a power source 230 (e.g. a battery), an operating system 228, and one or more applications 232 that are configured to run on user device 202. As a user device is in operation, the operating system 228 and applications 232 draw on the power source 230 of the user device 202 as information and/or data is exchanged with networks 222 and 224. According to some aspects of the present technology, user device 202 includes radio state modification module 214, comprising power monitoring module 216, state change module 218 and capability transmission module 220. The radio state module 214 is in communication, and operates in conjunction with, any one of the operating system 228, applications 232, or power source 230.

When user device 202 is in operation (e.g. running applications 232 or exchanging information/data with one or more networks 222, 224), user device 202 monitors one or more device properties associated with the power of the user device 202, for example the power consumption of the user device, the user device activity, or the power source (e.g. battery) charge level of the user device 202. In some implementations, user device 202 monitors the device properties via power monitoring module 216. As user device 202 monitors the device properties associated with the power of the user device 202, it can detect a triggering event associated with any one of those properties. For example, a triggering event can be instantiated when the power consumption of the user device 202 is above a certain threshold (e.g. rate at which power is being drawn on the device), when the activity of the user device 202 is above a certain threshold (e.g., applications running, information/data being exchanged with the network), or when the battery change level of user device 202 is below a threshold (e.g. battery percentage).

Based on the detected triggering event, user device 202 can determine a radio state change for the user device 202, for example via state change module 218. Subsequently, based on the determined radio state change, the radio state of the user device 202 can be automatically modified. For example, the radio state of the user device 202 can be any combination of 5G with high power (HP) capabilities enabled, 4G with HP capabilities enabled, 5G with HP capabilities disabled, 4G with HP capabilities disabled, 5G disabled, and 4G disabled. When the radio state of the user device 202 is modified, it will be understood that the HP capabilities of user device 202 can be turned on or off, and either one, or both, transmitters 208, 210 can be turned on or off. In some embodiments, based on the detected triggering event, one or more selectable radio options can be generated for display on user device 202. Subsequently, based on a user selection of the one or more radio options, the radio state of user device 202 can be modified. Once modified, the radio state of user device 202 can be stored, for example in a radio state profile 213 within memory 212 of the user device 202.

Based on the radio state of the user device 202, information can then be transmitted to cell site 204 (e.g. via capability transmission module 220), for instance information comprising modified user device capability information. The modified user device capability information can be the current radio state of the user device, a delta corresponding to the change in radio state of the user device, or any other information derived from the radio state of the user device. In some embodiments, user device capability information or other information regarding the radio state of user device 202 can be periodically sent to cell site 204 even if the radio state has not been modified. For example, user device capability information can be sent to cell site 204 at certain time intervals or upon a request received from cell site 204. In some embodiments, user device capability information or modified user device capability information is transmitted to the cell site as an information element contained in a channel status information (CSI) report. Based on the user device capability information, or modified user device capability information, the user device 202 context can be changed at the cell site and stored, for example in data store 226. The context of a user device can be used by the components of a cell site (e.g. 114 of FIG. 1) to determine resources to send to user device 202. As such, user device 202 can subsequently receive communications from the cell site based on the user device capability information, or modified user device capability information.

Referring to FIG. 3, a flow diagram is provided showing a method of dynamically modifying a radio state of a user device according to the technology described herein. At step 310, a radio state change for a user device is determined, where the user device has an initial radio state. The radio state change can be determined based on a triggering event corresponding to a monitored property of the user device, such a monitored property associated with the power of a user device. The monitored property associated with the power of the user device could be, for example, the power consumption of the user device, user device activity (e.g. what applications the user device is running and what information/data the user device is sending and receiving from one or more networks), or a battery charge level of the user device. In some embodiments, the triggering event can be a power consumption of the user device above a certain threshold, a user device activity above a certain threshold, a battery charge level below a certain threshold, or a combination of these. It will be appreciated that the thresholds of these triggering events can be preprogrammed or set by the user of the user device.

Based on the determined radio state change, at step 320, the radio state of the user device is automatically modified or otherwise changed from the initial radio state to another radio state (i.e. a modified radio state). The radio state of the user device can be any combination of 5G with high power (HP) capabilities enabled, 4G with HP capabilities enabled, 5G with HP capabilities disabled, 4G with HP capabilities disabled, 5G disabled, and 4G disabled. For example, if the initial radio state of the user device is 5G with high power (HP) capabilities enabled and 4G with HP capabilities enabled, based on the determined radio state change, the radio state of the user device may be modified to 5G with HP capabilities disabled and 4G with HP capabilities enabled. Alternatively, in some embodiments, based on the triggering event one or more selectable radio options may be generated for display on the user device such that a user can select a modified radio state. At step 330, the user device capability information is transmitted to a cell site in communication with one or more networks. The user device capability information can be derived from the modified radio state of the user device. Based on the transmitted user device capability information, a change in the user device context at the cell site can be made so that one or more components of the cell site can determine what resources or information to provide to the user device. As such, at step 340, communications are then received by the user device from the cell site based on the transmitted user device capability information or the updated context of the user device at the cell site. It will be appreciated that as a user device changes locations, thereby connecting to a different cell site, the user device context can be transferred or otherwise transmitted from the cell site to a second cell site based on a determined location of the user device.

Referring to FIG. 4, a flow diagram is provided depicting a method for providing data to a user device based on dynamically changing radio states, according to aspects of the technology described herein. At step 410, a cell site in communication with one or more networks receives modified user device capability information corresponding to a user device. The modified user device capability information, for example, can be derived from a change in the radio state of the user device. The change in the radio state of the user device can be caused by a triggering event corresponding to one or more user device properties, for example user device properties associated with a monitored power attribute. Based on the received modified user device capability information, at step 420 the user device context can be updated at the cell site. The user device context can be stored at the cell site, for example in a data store, and further be transferred or transmitted to one or more additional cell sites (e.g. based on a determined location of the user device). Based on the updated user device context, at step 430, data can be communicated to the user device, for example the cell site can determine resources to allocate to the user device or other data/information to transmit to the user device.

Figure 5:
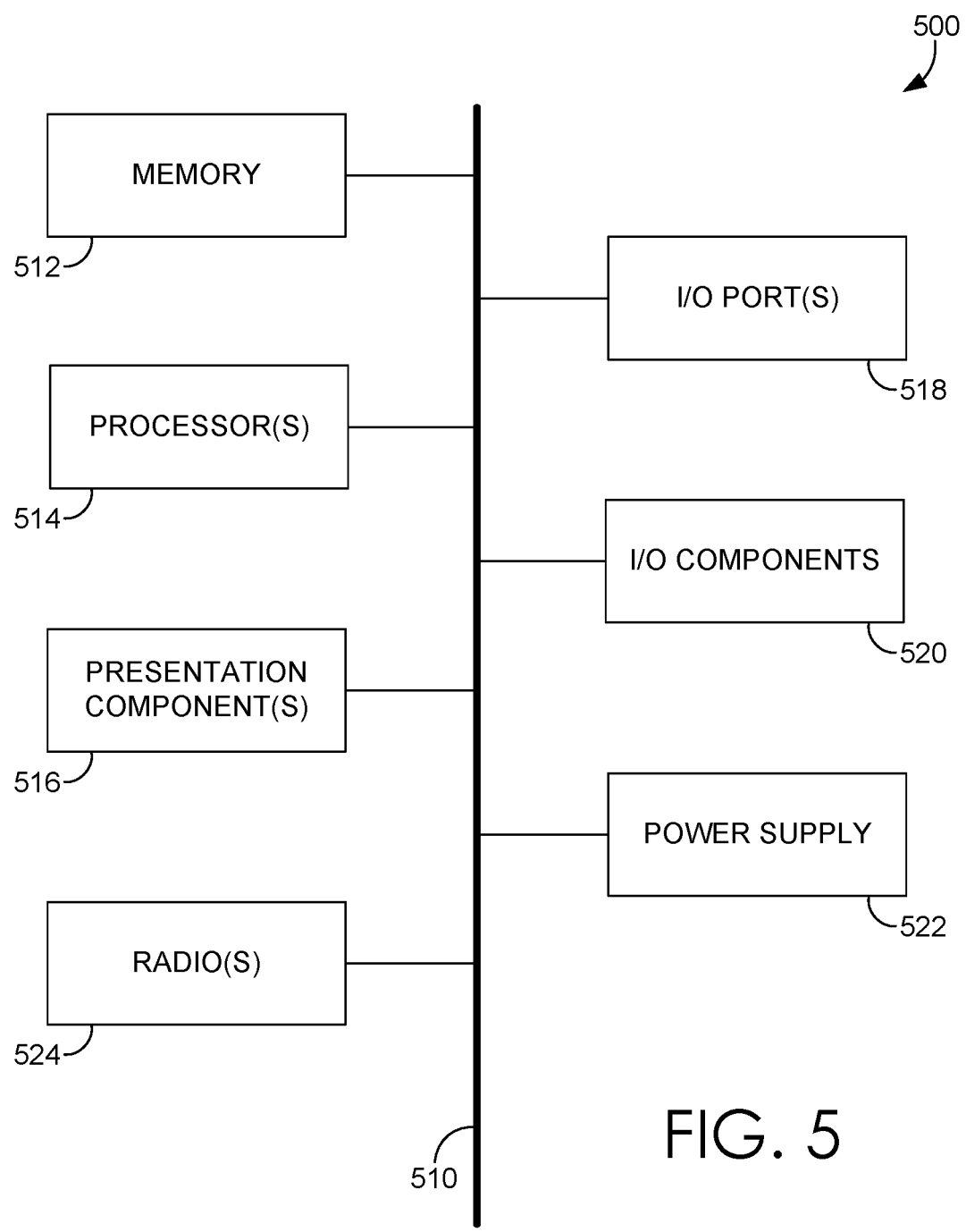
FIG. 5 depicts an example computing environment suitable for use in implementation of the present disclosure.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 5G, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 522 or to other network components, including through one or more electrical connections or couplings. Power supply 522 may be configured to selectively supply power to different components independently and/or concurrently.

Many variations can be made to the illustrated embodiments of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and sub combinations are of utility and may be employed without reference to other features and sub combinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

What is claimed is:

1. A method for dynamically modifying a radio state of a user device, the method comprising:
   monitoring, by the user device, one or more device properties associated with a power consumption of the user device;
   determining a radio state change for the user device based on a triggering event corresponding to the one or more device properties, wherein the radio state of the user device comprises at least one of: 5G with high power (HP) capabilities enabled, 4G with HP capabilities enabled, 5G with HP capabilities disabled, 4G with HP capabilities disabled, 5G disabled, and 4G disabled;
   based on the determined radio state change, automatically modifying the radio state of the user device;
   transmitting information to a cell site in communication with a network based on the radio state of the user device, wherein a portion of the information comprises modified user device capability information; and
   receiving communications based, in part, on the modified user device capability information.

2. The method of claim 1, wherein the one or more device properties comprise at least one of: the power consumption of the user device, user device activity, and battery charge level.

3. The method of claim 2, wherein the triggering event comprises one of: the power consumption of the user device above a threshold, a user device activity above a threshold, and a battery charge level below a threshold.

4. The method of claim 3, further comprising: causing a change in a user device context at the cell site based on the modified user device capability information.

5. The method of claim 3, wherein a user device context is transmitted from the cell site to a second cell site based on a determined location of the user device.

6. The method of claim 3, further comprising: generating for display on the user device, one or more selectable radio options based on the triggering event.

7. The method of claim 6, further comprising: modifying the radio state of the user device based on a user selection of the one or more selectable radio options.

8. The method of claim 3, wherein the modified user device capability information is transmitted to the cell site as an information element contained in a channel status information (CSI) report.

9. One or more computer-readable media having computer-executable instructions embodied thereon that, when executed, perform a method for dynamically changing a radio state of a user device, the method comprising:
   determining a radio state change for the user device having an initial radio state based on a triggering event corresponding to a monitored user device property associated with a power consumption of the user device, wherein the radio state of the user device comprises at least one of: 5G with high power (HP) capabilities enabled, 4G with HP capabilities enabled, 5G with HP capabilities disabled, 4G with HP capabilities disabled, 5G disabled, and 4G disabled;
based on the determined radio state change, automatically modifying the radio state of the user device;
transmitting user device capability information to a cell site in communication with a network, the user device capability information derived from the modified radio state of the user device; and
receiving communications by the user device based on the user device capability information.

10. The method of claim 9, wherein the monitored user device property is at least one of: the power consumption of the user device, user device activity, and battery charge level.

11. The method of claim 10, wherein the triggering event comprises one of: the power consumption of the user device above a threshold, a user device activity above a threshold, and a battery charge level below a threshold.

12. The method of claim 9, further comprising: causing a change in a user device context at the cell site based on the transmitted user device capability information.

13. The method of claim 9, further comprising:
generating for display on the user device, one or more selectable radio options based on the triggering event; and
modifying the radio state of the user device based on a user selection of the one or more radio options.

14. The method of claim 9, wherein the user device capability information is transmitted to the cell site as an information element contained in a channel status information (CSI) report.

15. A method for providing data to a user device based on dynamically changing radio states of the user device, the method comprising:
receiving, by a cell site in communication with a network, modified user device capability information corresponding to a user device, wherein the modified user device capability information is derived from a change in a radio state of the user device, wherein the radio state of the user device comprises at least one of: 5G with high power (HP) capabilities enabled, 4G with HP capabilities enabled, 5G with HP capabilities disabled, 4G with HP capabilities disabled, 5G disabled, and 4G disabled;
based on the modified user device capability information, updating a user device context at the cell site; and
communicating data to the user device based on the updated user device context.

16. The method of claim 15, wherein the communicating data to the user device comprises allocating resources to the user device by the cell site.

17. The method of claim 15, wherein a user device context is transmitted from the cell site to a second cell site based on a determined location of the user device.

18. The method of claim 15, wherein the change in the radio state of the user device is caused by a triggering event corresponding to one or more user device properties, the one or more user device properties associated with a monitored power consumption of the user device.

* * * * *